United States Patent
Fontela

(10) Patent No.: US 10,093,079 B2
(45) Date of Patent: Oct. 9, 2018

(54) REINFORCED SAFETY GLASS AND METHOD OF MANUFACTURE

(71) Applicant: Alberto Oscar Fontela, Buenos Aires (AR)

(72) Inventor: Alberto Oscar Fontela, Buenos Aires (AR)

(73) Assignees: Alberto Oscar Fontela, Buenos Aires (AR); David Nahuel Pitarch, Buenos Aires (AR)

( * ) Notice: Subject to any disclaimer, the term of this patent is extended or adjusted under 35 U.S.C. 154(b) by 203 days.

(21) Appl. No.: 15/152,784

(22) Filed: May 12, 2016

(65) Prior Publication Data

US 2017/0072662 A1 Mar. 16, 2017

(30) Foreign Application Priority Data

Sep. 10, 2015 (AR) ............................. 20150102890

(51) Int. Cl.
| | | |
|---|---|---|
| *B32B 7/10* | (2006.01) | |
| *B32B 17/12* | (2006.01) | |
| *B60J 1/20* | (2006.01) | |
| *B32B 17/10* | (2006.01) | |
| *B32B 7/12* | (2006.01) | |

(52) U.S. Cl.
CPC ............ *B32B 17/1077* (2013.01); *B32B 7/12* (2013.01); *B32B 17/10018* (2013.01); *B32B 17/10091* (2013.01); *B32B 17/1099* (2013.01); *B32B 17/10752* (2013.01); *B32B 17/10779* (2013.01); *B32B 17/10816* (2013.01); *B32B 17/10981* (2013.01); *B60J 1/2094* (2013.01); *B32B 2307/72* (2013.01); *B32B 2605/006* (2013.01)

(58) Field of Classification Search
CPC . B32B 17/1077; B32B 7/12; B32B 17/10018; B32B 17/10091; B32B 17/10816; B32B 17/10981; B32B 17/1099; B32B 2307/72; B32B 2605/006; B32B 17/10779; B32B 17/10752; B60J 1/2094
See application file for complete search history.

(56) References Cited

U.S. PATENT DOCUMENTS

| | | | | |
|---|---|---|---|---|
| 4,112,171 A | * | 9/1978 | Molter | .............. B32B 17/10018 428/213 |
| 5,622,580 A | * | 4/1997 | Mannheim | ........ B32B 17/10018 100/295 |

OTHER PUBLICATIONS

Author unknown, Wikipedia webpage for polyethylene terephthalate, publication date unknown, https://en.wikipedia.org/wiki/Polyethylene_terephthalate.*

* cited by examiner

*Primary Examiner* — Patrick D Niland
(74) *Attorney, Agent, or Firm* — Cotman IP Law Group, PLC

(57) ABSTRACT

A reinforced safety glass and its manufacturing procedure are presented. The invention uses a vehicle's original glass, which is generally tempered, eliminating need for a new specific glass. The invention utilizes films of diverse reinforcing materials to increase the final resistance of the product and therefore reinforcing the original glass. During its manufacturing process, an autoclave is used for applying pressure and temperature to bond the reinforcing films to the original glass and between each other. The invention comprises the original glass to which at least one PU film and one C-PET film are orderly applied, ate least to the interior face of the glass.

16 Claims, 3 Drawing Sheets

REINFORCED SAFETY GLASS AND METHOD OF MANUFACTURE

BACKGROUND OF THE INVENTION

Field of the Invention

This invention refers to a reinforced safety glass and its manufacturing procedure. Although it may have diverse applications, its purpose arises from the need for safety glasses of high resistance in order to increase the safety of vehicles' occupants.

Description of the Related Art

The current status of the art involves diverse combinations of materials and procedures to obtain armored glasses. Common materials used are:

a) Polyvinyl butyral films (herein after referred to as "PVB"). Example: PVB films manufactured by Kuraray Arg.

b) PolyEthylene Terephthalate films (hereinafter referred to as "PET"), generally Crystallizable PolyEthylene Terephthalate because of its high transparency (hereinafter referred to as "C-PET"). Example: PET films manufactured by Kuraray Arg.

c) PolyUrethane films (hereinafter referred to as "PU"). Example: PU films manufactured by Dayplas S.A.

d) Safety films with adhesive, such as those manufactured by Llumar, 3M, Madico, Johnson & Johnson, Sunguard, etc.

e) Safety films without adhesive, such as those also manufactured by Llumar, 3M, Sunguard, etc. or safety films with adhesive from which the adhesive is eliminated.

f) Obviously, special glasses or original glasses used for this application.

Each of these materials have diverse densities and one or more layers may be used. The goal to obtain successful and pragmatic results for each need is based on the combination of films and especially on the procedure by which these films are combined with glasses. This is where this invention stands out and where the pillars which provide the basis for this patent application lie.

Furthermore, there are operating aspects such as a higher economy and flexibility of procedures, together with the impact of such procedures on the environment, which could not be solved to date.

In accordance with what has been analyzed above, here follow some antecedents for information purposes:

a) European Patent No. EP1322467B1 "INTRUSION RESISTANT GLASS LAMINATE" granted on Nov. 28, 2007. It consists of a laminated glass composed of: a first PBV film+a first PET film+a second PET film+a second PBV film, all of these inserted between two glasses. These films are placed between two glasses as usual.

Aside from the details of the procedure, in this case two PET films are placed between PBV films, all of which is placed between two glasses, that is to say, two glasses are needed.

b) U.S. Pat. No. 5,569,537 "Laminated glass with polyurethane resin layer and silane coupling agent layer" granted on Oct. 29, 1996. This patent protects laminated glass with polyurethane films which requires an adhesive agent. It is based on the chemical aspects of the silane agent.

c) U.S. Pat. No. 5,445,890 "Bullet resistant glass/glass, glass/plastic, and plastic/plastic laminate composites" granted on Aug. 29, 1995. This patent protects a composite of laminated glass which comprises at least 2 glasses bonded by a layer of adhesive polyester. It may or may not include a "plastic" film between the two glasses, bonded by adhesive polyester.

d) U.S. Pat. No. 4,241,140 "Laminated safety glass with polyurethane film", granted on Dec. 23, 1980. It specifically protects polyurethane film used for safety glasses.

e) U.S. Pat. No. 4,075,386 "Security film for shatterproofing windows" granted on Feb. 21, 1978. This patent refers to a method of applying films with adhesive and watery detergent. It comprises the basic concept of safety films.

f) PCT Patent Application WO2003006240 A1 "Compositor interlayer for laminated glass" published on Jan. 23, 2013. This application claims the joint use of PU and PVB without considering a key aspect of the procedure modified by this application.

i) U.S. Pat. No. 4,594,290 "Impact resistant laminate" granted on Jun. 10, 1986. It refers to a laminate with high ballistic resistance. It uses glass, PU, PMMA and PC.

Although we have seen great progress in safety glasses in the last decades, a correct combination of films without adhesive which only requires a single glass, offering exceptional characteristics regarding resistance to impact, high transparency and low impact on the environment, could not be achieved yet. These are the key aspects of this invention.

BRIEF SUMMARY OF THE INVENTION

One of the purposes of this invention is to manufacture a reinforced safety glass which offers high resistance to impacts using a single glass.

Another purpose of this invention is to manufacture a safety glass reinforced on its interior as well as its exterior faces.

Another purpose of this invention is to create an innovative procedure for the manufacturing of a reinforced safety glass which reduces substantially the impact on the environment.

Another purpose of this invention is to manufacture a reinforced safety glass which, once broken, avoids the risk of cuts, lacerations or injuries of any kind.

Additionally, another purpose of this invention is the manufacturing of a reinforced safety glass which offers a higher sound isolation inside vehicles.

Finally, another purpose of this invention is to manufacture a reinforced safety glass which decreases the passage of UV rays to the inside of vehicles, decreasing, as a result, the temperature inside them.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

The present invention comprising reinforced safety glass and its manufacturing procedure will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

Figure 1:
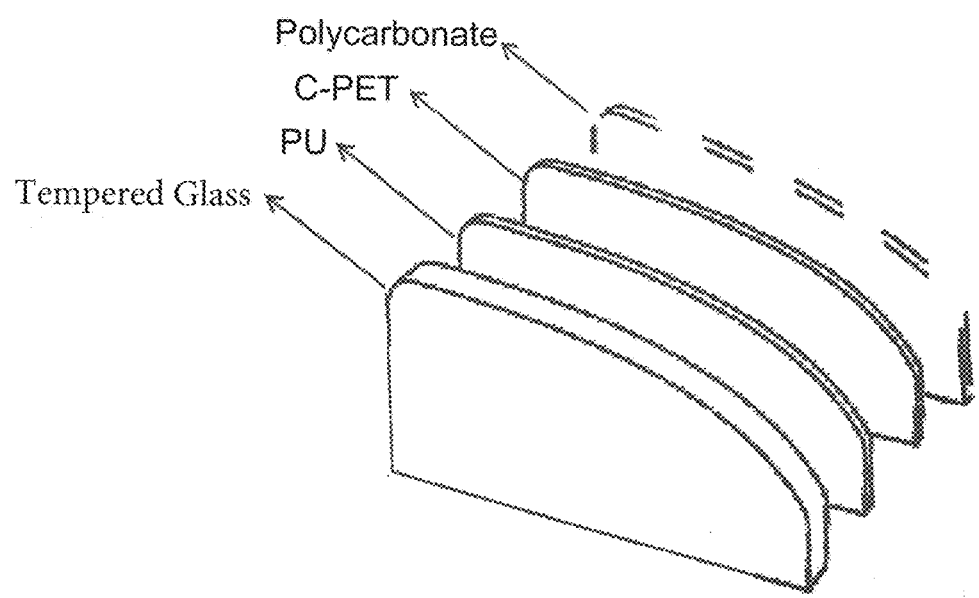
FIG. 1 shows the components of a first exemplary embodiment of the present invention, a reinforced safety glass.
Figure 2:
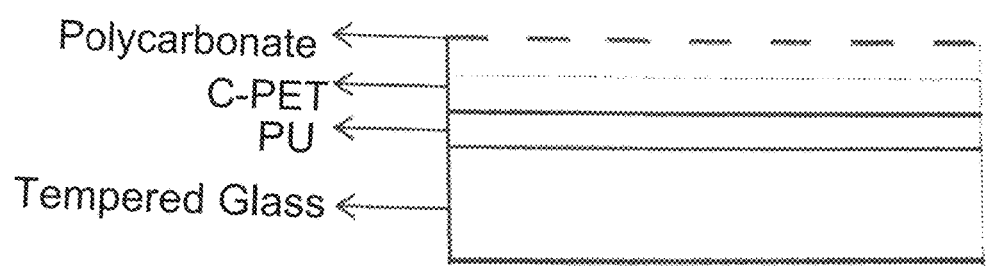
FIG. 2 shows a cut of the components of the first exemplary embodiment of this present invention, a reinforced safety glass, including a film of polycarbonate used as a bonding agent during the manufacturing process. Specifically, during the prelaminating process.
Figure 3:
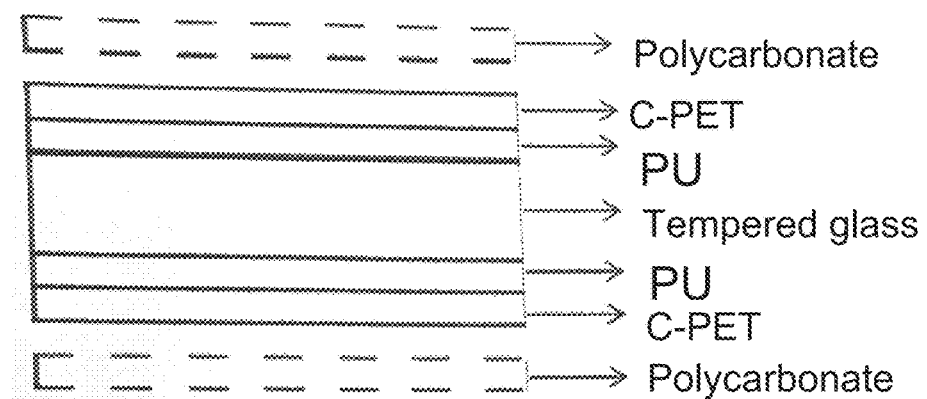
FIG. 3 shows a cut outline of the components of a second exemplary embodiment of this present invention, a reinforced safety glass, including two films of polycarbonate used during the manufacturing process. Specifically, during the prelaminating step.

FIGS. 1 to 3 will be used to describe the reinforced safety glass and its manufacturing procedure.

The reinforced safety glass of high resistance is used to provide higher safety to those protected by it. The glass may have diverse applications such as glass openings for houses, surveillance booths in general, banks, etc. However, its main application is in vehicles of any kind, because it can use a vehicle's original glass, therefore eliminating the need for a specific glass. This application stands out from other solutions because it does not require a new glass. However, those of skill in the arts would appreciate that it does no foreclose use of a new and/or specific type of glass.

In order to obtain the reinforced safety glass of this present invention films of diverse reinforcing materials are used, whose special features increase the final resistance of the invention, reinforcing the original glass. During the manufacturing process, pressure and temperature are applied using autoclave in order to bond the reinforcing films to the original glass and between each other.

From the point of view of its construction, the safety glass is composed of an original glass to be reinforced, with at least one PU film and one C-PET film bonded (in this same order) without adhesives to its interior face.

An exemplary embodiment of this present invention, comprises at least one PU film with a thickness of between 0.18 mm and 2 mm and a C-PET film with a thickness of between 0.18 mm and 2 mm.

Instead of PU and C-PET films, it is possible to apply a safety film without adhesive on the exterior face of the original glass to be reinforced. Another alternative is to apply a safety film with adhesive, that is to say, a film which includes adhesive. The thickness of the safety film, with or without adhesive, may vary between 40 µm and 400 µm.

There may be another exemplary embodiment of this present invention, a reinforced safety glass, where the exterior face of the glass is reinforced once the interior face is reinforced. In other words, at least one PU film and one C-PET film, are applied, in order, to the exterior face of the glass, without adhesives.

Having finished the description of the construction of the exemplary embodiments of this invention, the manufacturing steps of the reinforced safety glass are as follows:

Steps for the first exemplary embodiment:
a) thorough cleaning of the original glass;
b) ionize with ionizing gun at least one PU film;
c) insert at least one PU film on the interior face of the original glass;
d) ionize with ionizing gun at least one C-PET film;
e) place at least one C-PET film over at least one PU film;
f) eliminate the excess of PU and C-PET films;
g) place a cover (or layer) of polycarbonate, generally with a thickness of between 1.5 and 4 mm, over the last C-PET film;
h) place the product obtained from steps a) to g) inside a vacuum bag;
i) vacuum the obtained product;
j) introduce the vacuum bag inside an autoclave until it reaches a pressure of between 2 and 4 bar and a temperature of between 75° C. and 90° C.;
k) once it reaches the temperature and pressure values indicated in step j) keep them constant for 40 minutes to 60 minutes;
l) activate the cooling system of the autoclave until it reaches 70° C.;
m) eliminate the air from the autoclave and open it;
n) take the obtained product inside the vacuum bag out of the autoclave;
o) remove the polycarbonate cover;
p) make sure there are no air bubbles between the films;
q) introduce the obtained product (without the polycarbonate cover and the vacuum bag) inside the autoclave again;
r) activate the compressor and reach a pressure of between 1.5 and 3 bar;
s) activate the autoclave until it reaches a temperature of between 120 and 135° C. and a pressure of between 10 bar and 12 bar;
t) once it reaches the values indicated in step s) deactivate the compressor and the autoclave until the temperature lowers below 120° C.;
u) activate the cooling system of the autoclave until it reaches 70° C.;
v) eliminate the air in the autoclave and open it;
w) take the obtained product (the safety glass) out of the autoclave;
x) let it reach room temperature; and
y) polish the excedents of the films.

A second exemplary realization, comprises the same steps as the example above, with the addition of a step z). That is to say, the complete procedure comprises the following steps:
a) thorough cleaning of the original glass;
b) ionize with ionizing gun at least one PU film;
c) insert at least one PU film on the interior face of the original glass;
d) ionize with ionizing gun at least one C-PET film;
e) place at least one C-PET film over at least one PU film;

f) eliminate the excess of PU and C-PET films;

g) place a cover of polycarbonate, generally with a thickness of between 1.5 and 4 mm, over the last C-PET film;

h) place the product obtained from steps a) to g) inside a vacuum bag;

i) vacuum the obtained product;

j) introduce the vacuum bag inside an autoclave until it reaches a pressure of between 2 and 4 bar and a temperature of between 75° C. and 90° C.;

k) once reaches the temperature and pressure values indicated in step j) keep them constant for 40 minutes to 60 minutes;

l) activate the cooling system of the autoclave until it reaches 70° C.;

m) eliminate the air from the autoclave and open it;

n) take the obtained product inside the vacuum bag out of the autoclave;

o) remove the polycarbonate cover;

p) make sure there are no air bubbles between the films;

q) introduce the obtained product (without the polycarbonate cover and the vacuum bag) inside the autoclave again;

r) activate the compressor and reach a pressure of between 1.5 and 3 bar;

s) activate the autoclave until it reaches a temperature of between 120 and 135° C. and a pressure of between 10 bar and 12 bar;

t) once it reaches the values indicated in step s) deactivate the compressor and the autoclave until the temperature lowers below 120° C.;

u) activate the cooling system of the autoclave until it reaches 70° C.;

v) eliminate the air in the autoclave and open it;

w) take the obtained product (the safety glass) out of the autoclave;

x) let it reach room temperature;

y) polish the excedents of the films; and z) place a safety film over the exterior face of the original glass to be reinforced.

Finally, a third procedure, which is used for an exemplary realization which comprises the use of PU and C-PET films in both the exterior and interior faces of the tempered glass, is as follows:

a) thorough cleaning of the original glass;

b) ionize with ionizing gun at least one PU film;

c) insert at least one PU film on the interior face of the original glass;

d) ionize with ionizing gun at least one C-PET film;

e) place at least one C-PET film over at least one PU film;

f) repeat steps b) to e) applying these to PU and C-PET films in the exterior face of the glass to be reinforced;

g) eliminate the excedents of PU and C-PET films from the interior and exterior faces of the original glass;

h) place a polycarbonate cover (generally with a thickness of 1.5 to 4 mm) over the last C-PET films (both in the exterior and the interior faces of the original glass);

i) place the obtained product formed in steps a) to h) inside a vacuum bag;

j) vacuum the obtained product;

k) introduce the vacuum bag inside an autoclave until it reaches a pressure of between 2 bar and 4 bar and a temperature of between 75° C. and 90° C.;

l) once it has reached the temperature and pressure values indicated in step k) keep them constant for 40 minutes to 60 minutes;

m) activate the cooling system of the autoclave until it reaches 70° C.;

n) eliminate the air from the autoclave and open it;

o) take the obtained product inside the vacuum bag out of the autoclave;

p) remove the polycarbonate cover;

q) make sure there are no air bubbles between the films;

r) introduce the obtained product (without the polycarbonate cover and the vacuum bag) inside the autoclave again;

s) activate the compressor and reach a pressure of between 1.5 and 3 bar;

t) activate the autoclave until it reaches a temperature of between 120 and 135° C. and a pressure of between 10 bar and 12 bar;

u) once it reaches the pressure and temperature values indicated in steps s) and t), deactivate the compressor and the autoclave until the temperature lowers below 120° C.;

v) activate the cooling system of the autoclave until it reaches 70° C.;

w) eliminate the air in the autoclave and open it;

x) take the obtained product (the safety glass) out of the autoclave;

y) let it reach room temperature; and z) polish the excedents of the films.

The revolutionary aspect of this third "sandwich-type" procedure, where the laminated glass is bonded to both polymer films, is that it eliminates the risk of cuts, lacerations, or injuries of any kind in the event the tempered glass is damaged or broken. This is because all fragments of the laminated glass would stay adhered to either the internal or external polymer layers, or both.

As those of skill in this field would understand, this aspect arises from the procedure itself. The fact that the purpose of this description is to enable an ordinary person to put the invention into practice, should not leave aside the broadness of this application. That is to say, minor modifications, for instance in the number of films used (materials), their thickness, the temperatures and/or pressures of the autoclave during the diverse stages of the procedure to obtain the safety glass, etc., are contemplated in the present invention.

What is claimed is:

1. A reinforced safety glass comprising:
    a tempered glass with an interior and exterior surface;
    a first layer of at least one PolyUrethane (PU) film bonded to said interior surface;
    a first layer of at least one Crystallizable PolyEthylene Terephthalate ("C-PET") film bonded to said first layer of PU film;
    a second layer of at least one PU film bonded to said exterior surface; and
    a second layer of at least one C-PET film bonded to said second layer of PU film.

2. The reinforced safety glass of claim 1, wherein the at least one PU film has a thickness as between 0.18 mm and 2 mm.

3. The reinforced safety glass of claim 1, wherein the at least one C-PET film has a thickness of between 0.18 mm and 2 mm.

4. The reinforced safety glass of claim 1, wherein the PU film and C-PET film are applied without adhesives.

5. The reinforced safety glass of claim 1, further comprising a safety film applied on the exterior surface of the tempered glass.

6. The reinforced safety glass of claim 5, wherein said safety film is applied with adhesive on the exterior surface of the tempered glass.

7. The reinforced safety glass of claim 5, wherein said safety film is applied without adhesive on the exterior surface of the tempered glass.

8. The reinforced safety glass of claim 5, wherein said safety film has a thickness of between 40 μm and 400 μm.

9. The reinforced safety glass of claim 8, wherein the PU film and C-PET film are applied without adhesives.

10. The reinforced safety glass of claim 1, wherein said safety glass is manufactured by a process comprising:
   a) thoroughly cleaning the tempered glass;
   b) ionize at least one PU film with ionizing gun;
   c) place the at least one ionized PU film on the interior surface of the tempered glass;
   d) ionize at least one C-PET film with ionizing gun;
   e) place the at least one ionized C-PET film over the at least one ionized PU film;
   f) eliminate any excess PU and C-PET films;
   g) place a layer of polycarbonate over the last C-PET film, wherein the polycarbonate has a thickness of between 1.5 and 4 mm;
   h) place the obtained product from steps a) to g) inside a vacuum bag;
   i) vacuum the obtained product;
   j) introduce the vacuum bag inside an autoclave until the autoclave reaches a pressure of between 2 and 4 bar and a temperature of between 75° C. and 90° C.;
   k) once autoclave reaches the temperature and pressure values indicated in step j) keep the values constant for 40 minutes to 60 minutes;
   l) activate the cooling system of the autoclave until it reaches 70° C.;
   m) eliminate cooling air from the autoclave and open it;
   n) remove the obtained product from inside the vacuum bag and the autoclave;
   o) remove the polycarbonate cover;
   p) place the obtained product inside the autoclave again;
   q) activate the compressor and reach a pressure of between 1.5 and 3 bar;
   r) activate the autoclave until it reaches a temperature of between 120 and 135° C. and a pressure of between 10 bar and 12 bar;
   s) once the autoclave reaches the values indicated in step r) deactivate the compressor and the autoclave until the temperature reduces below 120° C.;
   t) activate the cooling system of the autoclave until it reaches 70° C.;
   u) eliminate cooling air in the autoclave and open it;
   v) take the obtained product out of the autoclave;
   w) let the obtained product reach room temperature; and
   x) polish any excedents of the films out of the obtained product, wherein the obtained product is the safety glass.

11. The reinforced safety glass of claim 10, further comprising:
   y) placing a safety film over the exterior surface of the safety glass.

12. A process of manufacturing a reinforced safety glass comprising:
   a) obtaining and thoroughly cleaning an original glass, wherein the original glass comprises an interior surface and an exterior surface;
   b) ionize at least one PU film with ionizing gun;
   c) place the at least one ionized PU film on the interior surface of the original glass;
   d) ionize at least one C-PET film with ionizing gun;
   e) place the at least one ionized C-PET film over the at least one ionized PU film;
   f) eliminate any excess PU and C-PET films;
   g) place a layer of polycarbonate over the last C-PET film, wherein the polycarbonate has a thickness of between 1.5 and 4 mm;
   h) place the obtained product from steps a) to g) inside a vacuum bag;
   i) vacuum the obtained product;
   j) introduce the vacuum bag inside an autoclave until the autoclave reaches a pressure of between 2 and 4 bar and a temperature of between 75° C. and 90° C.;
   k) once autoclave reaches the temperature and pressure values indicated in step j) keep the values constant for 40 minutes to 60 minutes;
   l) activate the cooling system of the autoclave until it reaches 70° C.;
   m) eliminate cooling air from the autoclave and open it;
   n) remove the obtained product from inside the vacuum bag and the autoclave;
   o) remove the polycarbonate cover;
   p) place the obtained product inside the autoclave again;
   q) activate the compressor and reach a pressure of between 1.5 and 3 bar;
   r) activate the autoclave until it reaches a temperature of between 120 and 135° C. and a pressure of between 10 bar and 12 bar;
   s) once the autoclave reaches the values indicated in step r) deactivate the compressor and the autoclave until the temperature reduces below 120° C.;
   t) activate the cooling system of the autoclave until it reaches 70° C.;
   u) eliminate cooling air in the autoclave and open it;
   v) take the obtained product out of the autoclave;
   w) let the obtained product reach room temperature; and
   x) polish any excedents of the films out of the obtained product, wherein the obtained product is the safety glass.

13. The process of claim 12, wherein the original glass is tempered.

14. The process of claim 12, further comprising:
   y) placing a safety film over the exterior surface of the safety glass.

15. A process of manufacturing a reinforced safety glass comprising:
   a) obtaining and thoroughly cleaning an original glass, wherein the original glass comprises an interior surface and an exterior surface;
   b) ionize at least one PU film with ionizing gun;
   c) place the at least one ionized PU film on the interior surface of the original glass;
   d) ionize at least one C-PET film with ionizing gun;
   e) place the at least one ionized C-PET film over the at least one ionized PU film;
   f) repeat steps b) to e) applying ionized PU and C-PET films to the exterior face of the original glass;
   g) eliminate any excedents of PU and C-PET films from the interior and exterior surfaces of the original glass;
   h) place a polycarbonate cover over the last C-PET film on both the exterior and the interior surfaces of the original glass;
   i) place the obtained product formed in steps a) to h) inside a vacuum bag;
   j) vacuum the obtained product;
   k) introduce the vacuum bag inside an autoclave until it reaches a pressure of between 2 bar and 4 bar and a temperature of between 75° C. and 90° C.;

l) once autoclave has reached the temperature and pressure values indicated in step k) keep values constant for 40 minutes to 60 minutes;
m) activate the cooling system of the autoclave until it reaches 70° C.;
n) eliminate cooling air from the autoclave and open it;
o) remove the obtained product from inside the vacuum bag and the autoclave;
p) remove the polycarbonate covers;
q) place the obtained product inside the autoclave again;
r) activate the compressor and reach a pressure of between 1.5 and 3 bar;
s) activate the autoclave until it reaches a temperature of between 120 and 135° C. and a pressure of between 10 bar and 12 bar;
t) once the autoclave reaches the pressure and temperature values indicated in step s), deactivate the compressor and the autoclave until the temperature reduces below 120° C.;
u) activate the cooling system of the autoclave until it reaches 70° C.;
v) eliminate cooling air in the autoclave and open it;
w) take the obtained product out of the autoclave;
x) let the obtained product cool down to room temperature; and
y) polish any excedents of the films of the obtained product, wherein the obtained product is the safety glass.

16. The process of claim 15, wherein the original glass is tempered.

* * * * *